UNITED STATES PATENT OFFICE.

GEORGE J. POPPLEIN, OF BALTIMORE, MARYLAND.

IMPROVEMENT IN FERTILIZERS.

Specification forming part of Letters Patent No. 174,568, dated March 7, 1876; application filed February 2, 1876.

*To all whom it may concern:*

Be it known that I, GEORGE J. POPPLEIN, of Baltimore city, State of Maryland, have invented a new and useful Improvement in Fertilizers; and I do hereby declare that the following is a full, clear, and exact description of the same.

The invention relates to fertilizing compounds for replacing cheaply and conveniently the elements that form the constituent parts or food of plants, and that have been eliminated therefrom by previous cropping, or are absent or deficient from some natural cause.

Soluble silica or silicic acid and the alkalies have been found by practical experiment to lie at the very foundation of successful cropping; and to supply these to the farmer in the shape of a cheap and easily-applied compound is the object of this invention.

I grind, pulverize, or otherwise reduce to a powdered, granulated, or comminuted state tripoli and any of the well-known forms of potash or soda. These are intimately mixed, and in such relative proportion as may be required by the condition of the soil, or the particular crop for which it is intended.

The tripoli or infusorial earth is derived from the remains of diatoms or minute vegetable organisms which float in water, are invisible to the naked eye, and constitute the food of oysters and other mollusks. The tripoli being a spongy earth has great absorbent power, so that the alkali, which cannot well be ground by itself, on account of its tendency to deliquesce, is relieved of its moisture as fast as it is evolved.

The compound is readily passed through the ordinary drills, can be sold to farmers at a very reasonable price, and may be made the basis of great improvement in almost every soil.

The tripoli and alkali may be used together, as specified, with marked and continually-increasing effect upon the soil, the grasses being made thereby to grow with great luxuriance, while it will give a much-increased product of almost every crop.

I preferably employ the following proportions: In wheat, silica, 144; potash, 36. In corn, silica, 84; potash, 75. In rye, silica, 98; potash, 33. In oats, silica, 48; potash, 14. In barley, silica, 76; potash, 32. In potatoes, silica, 43; potash, 179. In clover, silica, 18; potash, 80. In turnips, silica, 55; potash, 140. In carrots, silica, 60; potash, 134. In tobacco, silica, 23; potash, 73.

Having thus described my invention, what I claim is—

A fertilizing compound formed of tripoli or infusorial earth and potash or soda minutely subdivided and intimately mixed, as and for the purpose described.

GEORGE J. POPPLEIN.

Witnesses:
 SOLON C. KEMON,
 CHAS. A. PETTIT.